United States Patent [19]

Lewin

[11] Patent Number: 5,928,391
[45] Date of Patent: Jul. 27, 1999

[54] EXTRACTION FOR POROSITY IN POLYMER CELLS

[75] Inventor: Stanley Lewin, New Rochelle, N.Y.

[73] Assignee: Ultralife Batteries, Inc., N.Y.

[21] Appl. No.: 08/863,407

[22] Filed: May 27, 1997

Related U.S. Application Data

[63] Continuation of application No. 08/436,877, May 8, 1995, abandoned.

[51] Int. Cl.$^6$ .......................... H01M 10/38; H01M 10/40
[52] U.S. Cl. ........................ 29/623.5; 29/623.1; 429/189; 429/305
[58] Field of Search ................................ 29/623.1, 623.5; 429/192, 194, 218, 218.1, 300, 189, 305; 264/28, 49; 210/634

[56] References Cited

U.S. PATENT DOCUMENTS

| | | | |
|---|---|---|---|
| 4,190,707 | 2/1980 | Doi et al. ................................ | 429/254 |
| 5,028,363 | 7/1991 | Nishio et al. ............................ | 264/28 |
| 5,034,132 | 7/1991 | Miyakawa et al. ...................... | 210/634 |
| 5,281,491 | 1/1994 | Rein et al. ............................... | 429/62 |
| 5,296,318 | 3/1994 | Gozdz et al. ........................... | 429/192 |
| 5,540,741 | 7/1996 | Gozdz et al. ........................... | 29/623.5 |
| 5,690,703 | 11/1997 | Mitchell et al. ........................ | 29/623.5 |

*Primary Examiner*—Maria Nuzzolillo
*Assistant Examiner*—Carol Chaney
*Attorney, Agent, or Firm*—Graham & James LLP

[57] ABSTRACT

A method for production of porous electrodes and separators in polymer type electrochemical cells and batteries wherein electrodes and separator elements are mixed with polymeric filler materials such as dibutyl phthalate (DBP). The polymeric filler material is then removed to provide the requisite porosity for the electrodes and separator. The polymeric filler material, normally removed by use of volatile solvents, is instead removed by extraction with supercritical fluids, such as $CO_2$, which do not result in any hazardous residue or gases.

10 Claims, No Drawings

EXTRACTION FOR POROSITY IN POLYMER CELLS

The application is a continuation of Ser. No. 08/436,877 filed May 8,1995, now abandoned.

FIELD OF THE INVENTION

This invention relates to methods of making porous electrodes and separators for electrochemical cells and batteries and particularly to porous electrodes and separators used in polymer type cells and batteries and filler extraction methods used for effecting porosity therein.

BACKGROUND OF THE INVENTION

Electrodes, anodes and cathodes of electrochemical cells, and in particular polymer type cells (e.g., such as described in U.S. Pat. No. 5,296,318) having carbon anodes and spinel cathodes such as of $LiMn_2O_4$ and electrolyte separators made of porous cast fluoropolymers, require a certain minimum of porosity to permit for ionic and reaction material flow.

Porosity is normally readily achieved in electrode structures, comprised of compacted particles a s a result of the inherent spacing between the particles. However, in polymer type electrochemical cells, the electrodes and electrolyte separators are made by casting, extrusion or other similar type methods, wherein a non-porous sheet of material is formed by the process.

In order to achieve sufficient porosity in such cast or extruded electrodes or separators, the materials comprising the electrodes or separators further include a homogeneously dispersed inert extractable material, such as the commonly utilized dibutyl phthalate (DBP) plasticizer in an amount (usually related to the volume of the electrode or separator) which will provide micro-porous passageways of the desired porosity in the electrodes or separators when the filler material is extracted. The filler material is inert relative to the electrode or separator material with which it is admixed.

In a common method utilized in the prior art, the filler material is removed by selective solvent extraction wherein the filler material is selected to be fully soluble in an extractant solvent and the electrode or separator material is insoluble in the is extractant solvent.

Typical solvents used in standard techniques are volatile organic solvents such as diethyl ether, petroleum ether, methanol, ethanol and the like. These substances are however flammable, expensive, explosive and toxic and are on the EPA's list of controlled chemicals. In addition, such materials are difficult to use and dispose of properly.

It is therefore an object of the present invention to provide a means for production of porous electrodes and electrolyte separators for electrochemical cells, and particularly polymer cells, by removal of filler materials therefrom with an inexpensive, relatively safe, filler extractant material.

It is a further object of the present invention to utilize said filler extractant material with substantially complete and rapid filler removal, without degradation or removal of materials used in the electrodes and separators of said cells.

These and other objects, features and advantages of the present invention will become more evident from the following discussion.

SUMMARY OF THE INVENTION

Generally the present invention comprises a method for the production of porous components, i.e., electrodes (anodes and cathodes) and/or electrolyte separator elements in electrochemical cells. The method comprises the steps of admixing an electrode or separator material with an inert filler material, forming the electrode or separator into a desired shape or configuration, and extracting the filler material from the electrodes and/or separator by means of a solvent in which the filler material is soluble and in which the electrodes and/or separator material is insoluble, characterized in that the extracting solvent is a supercritical fluid. Micropores are thereby formed, representing the space formerly occupied by the extracted filler material. The extraction step may be separately effected with the individual electrode and separator elements, though, more preferably, extraction is effected after the electrodes and separator elements have been laminated with each other into the completed cell structure.

In a particularly preferred embodiment of the present invention, the supercritical fluid is carbon dioxide ($CO_2$) which is non-toxic, non-polluting, non-explosive, non-flammable, environmentally safe, economical and readily recyclable and does not leave any residue.

Supercritical fluids are generally comprised of materials which are gases at room temperature but which have been compressed to high pressure, generally above 1000 psi, whereby they become liquid. Thereafter the temperature of the liquid is elevated to reach a "supercritical" phase wherein the resultant fluid has properties of both a gas and a liquid. Carbon dioxide ($CO_2$) at sufficiently low temperatures, directly becomes a sublimable solid under normal pressure conditions. With increase in both temperature and pressure, sublimation can be retarded, with the $CO_2$ forming a liquid. Further increase in temperature and pressure results in a supercritical fluid which is a borderline gas and liquid. At temperatures above 87.8° F., $CO_2$ can no longer exist as a liquid, but with sufficient pressure, the $CO_2$ exists as supercritical $CO_2$. Compressed $CO_2$ which was warmed to a temperature just above 89° F. has such properties, whereby it diffuses as a gas, and has the density of a liquid. Though supercritical $CO_2$ has been used as a solvent in the food, chemical and pharmaceutical industries, it has been surprisingly found that it is usefully operable as a selective solvent in providing the porous electrodes and separator components in an electrochemical cell.

DETAILED DESCRIPTION OF THE INVENTION

Polymer type rechargeable electrochemical cells are generally comprised of carbon anodes, cathodes of lithium intercalation compounds such as spinel materials, e.g. $LiMn_2O_4$, and a solid polymeric electrolyte separator layer, usually comprised of a fluoropolymer. Specific examples of useful materials and structures of the cells and cell components are, for example, described in the aforementioned patent. The materials of the electrodes and electrolyte are usually admixed with binders and are cast onto glass substrates or are extruded into solid sheet form. Conductive materials, such as expanded metal of aluminum or copper (Exmet®) are affixed with both heat and pressure to the electrodes. The respective layers of the electrodes and electrolyte separator however remain very thin, generally on the order of 5–6 mils for the anode, 9–12 mils for the cathode and 3–9 mils for the polymer electrolyte, with a total cell thickness of about 18–25 mils. Because of the nature of the electrodes and electrolyte it is very difficult to render the cast or extruded sheets porous to make them suitable for use in a cell. Accordingly, prior to casting or extrusion, the electrodes and electrolyte are admixed with a filler material which is subsequently removed to leave micropores. The filler material is preferably a material such as dibutyl phthalate (DBP) plasticizer and is present in relatively large amounts in the anode material mix (about 25% by weight), prior to casting or extrusion. In the cathode the DBP is about 25% and about 50% in the electrolyte. After the respective electrode and electrolyte materials are cast or extruded and/or assembled into a completed cell with laminated cell components, the DBP is effectively completely removed in prior art methods by solvent extraction with materials such as ether, alcohol, and the like. However, as described above, such materials are difficult to safely handle and store and are essentially not economically reusable.

In accordance with the present invention, supercritical fluids and in particular supercritical $CO_2$ are used to remove the DBP or other filler material, to provide the requisite porosity. Since the $CO_2$ must be maintained at a minimum specific temperature of about 87.8° F. and an elevated pressure, the cell components, requiring solvent extraction (i.e., individual cell components or, more preferably, an entire laminated cell or group of cells) are placed in a pressurized vessel kept at an elevated temperature of at least about 40° C. and a minimum pressure of 1000 psi and preferably within the range of 2000 to 4000 psi, for a period of at least about 15 minutes, to ensure complete extraction of the filler material.

After extraction, the porous cell components (electrodes and polymer electrolyte) are removed from the pressure vessel and processed in the normal fashion in constructing electrochemical cells and batteries. If completed cells have had their components rendered porous, the cell or cells are removed and then processed into cell or battery structures for final use.

Separation of the $CO_2$ from the extracted filler material is automatically effected by release of pressure whereby the $CO_2$ reverts to gaseous form (which may be collected for re-use) and the DBP or other filler material remains separated in solid or liquid (DBP is normally in a liquid state) form for re-use as well.

It is understood that details of specific materials of electrodes and/or polymer and other solid electrolyte materials may vary as well as the nature and processing parameters of the supercritical fluids used in the method of the present invention without departing from the scope of the invention as defined in the following claims.

What is claimed is:

1. A method for the production of porous sheet components for use as at least one of an anode, a cathode, and a solid polymer electrolyte in an electrochemical cell, said method comprising the steps of:

a. admixing a material which comprises at least one of an anode, a cathode, and a solid polymer electrolyte of said electrochemical cell, with an inert filler material, with said filler material comprising at least 25% by weight of the at least one of an anode, a cathode and a solid polymer electrolyte;

b. forming the component into a non-porous sheet of a desired configuration for said at least one of an anode, a cathode and a solid polymer electrolyte; and c. extracting the filler material from the component by means of a solvent in which the filler material is soluble and in which the component material is insoluble, whereby micropores are formed in said component, the improvement comprising extracting the filler material with an extracting solvent which is a supercritical fluid.

2. The method of claim 1, wherein said electrochemical cell is a rechargeable lithium cell having a polymer electrolyte.

3. The method of claim 2, wherein said component is a cathode of said cell.

4. The method of claim 2, wherein said component is an anode of said cell.

5. The method of claim 2, wherein said component is the polymer electrolyte.

6. A method for the production of a porous component for use as an anode, a cathode, and a solid polymer electrolyte in an electrochemical cell, said method comprising the steps of:

a. separately admixing materials which comprise the anode, cathode, and solid polymer electrolyte of said electrochemical cell, with an inert filler material, with said filler material comprising at least 25% by weight of each of the anode, cathode and solid polymer electrolyte;

b. forming the component of anode, cathode and solid polymer electrolyte into a non-porous desired configuration for said cell; and c. extracting the filler material from the component by means of a solvent in which the filler material is soluble and in which the component material is insoluble, whereby micropores are formed in said component, the improvement comprising said extracting solvent being a supercritical fluid;

wherein said electrochemical cell is a rechargeable lithium cell having a polymer electrolyte; and wherein said component comprises a cell structure comprised of an anode, a cathode and a separator therebetween in a unitary structure.

7. The method according to any of claims 3–6, wherein said supercritical fluid is comprised of $CO_2$.

8. The method of claim 6, wherein said filler is extracted under conditions of a temperature of at least 40° C. and a pressure of at least 1000 psi.

9. The method of claim 6, wherein said pressure ranges between 2000 psi and 4000 psi.

10. The method of claim 6, wherein said filler comprises dibutyl phthalate.

* * * * *